United States Patent [19]
Bahrton

[11] Patent Number: 5,554,805
[45] Date of Patent: Sep. 10, 1996

[54] FLOWMETER WITH A VARIABLE CONSTRICTION

[76] Inventor: Göran Bahrton, Högomsvägen 40, S-183 50 Täby, Sweden

[21] Appl. No.: 256,006

[22] PCT Filed: Dec. 11, 1992

[86] PCT No.: PCT/SE92/00856

§ 371 Date: Jun. 16, 1994

§ 102(e) Date: Jun. 16, 1994

[87] PCT Pub. No.: WO93/12406

PCT Pub. Date: Jun. 24, 1993

[30] Foreign Application Priority Data

Dec. 17, 1991 [SE] Sweden ................................. 9103735

[51] Int. Cl.$^6$ .................................. G01F 1/00; G01F 5/00
[52] U.S. Cl. ................... 73/202; 73/861.52; 73/861.58; 73/3
[58] Field of Search ................ 73/202, 203, 861.48, 73/861.52, 861.53, 861.55, 861.58, 3

[56] References Cited

U.S. PATENT DOCUMENTS

| | | | |
|---|---|---|---|
| 3,252,324 | 5/1966 | Steele | 73/861.58 |
| 3,554,031 | 1/1971 | Turner | 73/861.58 |
| 4,459,860 | 7/1984 | Walters | 73/861.55 |
| 4,461,173 | 7/1984 | Olin | 73/203 |
| 4,524,616 | 6/1985 | Drexel et al. | 73/203 |
| 5,333,496 | 8/1994 | Fenelon | 73/202 |

FOREIGN PATENT DOCUMENTS 1566251  4/1980  United Kingdom.
2257     2/1986  United Kingdom.

Primary Examiner—Richard Chilcot
Assistant Examiner—Harshad Patel
Attorney, Agent, or Firm—Klarquist Sparkman Campbell Leigh & Whinston

[57] ABSTRACT

A flowmeter with a main conduit having a constriction formed therein through which a main flow passes, and a by-pass conduit which is in fluid connection with the main conduit upstream and downstream of the constriction and in which a by-pass flow passes in response to a pressure drop across the constriction. The constriction includes a conical body which is movable within the main conduit to produce an increasing flow area in response to an increasing pressure drop across the constriction. A by-pass flowmeter is provided in the by-pass conduit which produces signals in proportion to a by-pass flow through the by-pass conduit. A calibrated electronic signal converter converts signals produced by the by-pass flowmeter to signals which correspond to the total flow through the main conduit.

9 Claims, 2 Drawing Sheets

FLOWMETER WITH A VARIABLE CONSTRICTION

TECHNICAL FIELD

The present invention relates to a flowmeter which is adapted to enable the total fluid flow through a conduit to be measured, this conduit being referred to hereinafter as the main conduit.

The invention can also be applied to measure the prevailing rate of flow, although for the sake of simplicity, the flowmeter will be described herebelow with reference solely to its alternative function of measuring the total fluid flow.

The invention is a further development of a flowmeter which utilizes a flowmeter constriction arranged or inserted in a section of the main conduit, a measuring conduit which extends parallel with the main conduit section and is connected across the constriction, wherein a subflow is caused to pass through the measuring conduit in response to the pressure difference across the constriction caused by the rate of flow in the main conduit section, a subflow meter connected in the measuring conduit, and an electric signal converter with associated correction unit constructed to convert a signal delivered by the subflow meter to a proportional signal which corresponds to the total flow through the main conduit and which is applied to a flow registering or flow presenting means.

It will be understood that with flowmeters of this kind, the flow measured in a measuring conduit will always have a given primary relationship with the total flow through the main conduit and a given secondary relationship with the flow passing through the flowmeter of which said conduit section forms part. This first, primary relationship is the relationship significant to the present invention.

BACKGROUND ART

Flowmeters of the aforedescribed kind are known to the art and can be referred to as "by-pass flowmeters", since a determined part of the momentary total flow through the main conduit is caused to pass through the measuring conduit and the volume of this flow is proportional to the total flow through the main conduit. These known flowmeters include a larger or smaller fixed throttling orifice in the main conduit section, and the measuring conduit, or branch pipe, connected in parallel across the constriction includes a flowmeter which delivers a signal corresponding to the flow (or rate of flow) through the measuring conduit.

For the sake of simplification, this signal is exemplified in the following description as one pulse per unit of volume passing through the measuring conduit.

A measured frequency multiplied by the volume unit can then be considered proportional to the by-pass flow or the percentage of flow through the subflow meter and therewith, with a chosen constant, also proportional to the total flow through the main conduit.

The pressure difference occurring across the throttle will increase with increasing flow through the throughflow area of the throttle and therewith drive the by-pass flow through the measuring conduit and the measuring device and through the main conduit section of the flowmeter.

It is known that a maximized, accepted pressure difference and flow rate in the measuring conduit and through the subflow meter is applicable to a maximum total flow through the main conduit.

It is also known to use the same by-pass meter for different measuring ranges, by appropriately dimensioning the cross-section of the main conduit and the size of the throttle in accordance with a chosen measuring range.

Among other things, it is necessary to afford each flowmeter with the largest possible measuring range or dynamics, as will be explained more precisely in the following.

In the case of a by-pass meter of the type intended here and described in some detail in the aforegoing, it is known that when the resistance coefficient of the throttle and the measuring conduit together with the by-pass meter are equal and the flow is turbulent, the ratio of the flow through the throttle to the flow through the measuring conduit will be constant, and that the signal delivered by the flowmeter in the measuring conduit will be proportional to the sum of both flows.

The British Patent Specification 2257/1886 discloses an arrangement which includes a by-pass meter and a variable throttle. Since this throttle is located downstream of the by-pass meter where the unmeasured main flow and the measured by-pass flow combine to form a common flow, the ratio of the main flow to the by-pass flow is not affected by the throttle. The throttle is obtained with the aid of a pivotally suspended flap which is constructed to maintain a constant proportionality between measured and unmeasured water flows, irrespective of the instant positional setting of the flap.

The flap functions to urge the measuring flow through the by-pass meter, which is comprised of an impeller, in response to the pressure exerted thereon by the main flow, which results in an unequivocal ratio between the occurrent pressure and the generated measuring flow with unchanged low flowmeter dynamics.

Practical tests performed on the known by-pass flowmeters have normally shown a flowmeter dynamic in the order of 50:1. A flowmeter dynamic in the order of 100:1 is most unusual if it can be achieved at all with good linearity while satisfying other general demands.

It is well known to the person skilled in this art that the advantages afforded by by-pass meters of hitherto known construction reside in the possibility to construct large flowmeters adapted to large volumes at low costs, and that one disadvantage of such flowmeters resides in their excessively restricted flowmeter dynamics.

Also belonging to the earlier standpoint of techniques with regard to the inventive flowmeter are flowmeters which function according to other concepts, namely flowmeters which lack a measuring conduit through which a by-pass passes.

According to one embodiment of this latter flowmeter, a restriction is used in the main conduit and flow is measured by sensing the instant pressure difference between occurrent pressures on each side of the constriction.

In a flowmeter of this kind, the flow detected by the meter is proportional to the square root of the pressure difference.

Flowmeters of this category have been found to be highly accurate within a pressure difference range of 50:1, which then gives a flowmeter dynamic of only about 7:1, at a constant throughflow area formed by the constriction and obtained, for instance, by using an orifice plate, a measuring flange, a measuring nozzle, a Venturi tube or some like device.

While taking into account the requirement of a maximized, accepted pressure difference across the constriction, various measures have earlier been proposed for attempting to increase the measuring range of the flowmeter or to increase the flowmeter dynamics (Qmax:Qmin) while maintaining the pressure drop (the pressure losses) through the flowmeter at an acceptable low level.

It is earlier known in this regard to increase flowmeter dynamics with the aid of a throughflow area which is dependent on the instant flow and which is therefore variable. The measuring device connected to the system still measures the flow as a function of the occurrent pressure drop across the constriction.

In the case of such pressure difference flowmeters, it is known to determine the occurrent, instant pressure drop with the aid of a pressure differential transmitter.

It is also earlier known that flowmeter dynamics can be improved when the variable throughflow area is permitted to increase with increasing pressure difference, and vice versa. This is achieved with the aid of an axially movable and spring-biassed throttling body placed in the main conduit, for instance a flow throttling body of the kind illustrated and described in British Patent Specification 1,566,251. In this regard, it has been found that the flowmeter dynamics can be increased to an order of magnitude of 50:1.

Finally, it can be mentioned that it is known that the dynamics of a flowmeters can be increased by up to 50:1 when an inductive transducer is used directly in the main conduit. However, this increase in flowmeter dynamics is obtained at the cost of the possible choice of the flowing medium, since an inductive transducer requires the presence of an electrically conductive medium.

It is also known to detect the output signal from different measuring devices with the aid of electronic signal converters and to convert the signal to a proportional signal corresponding to a total medium flow, in accordance with a mathematical function.

It is possible to introduce minor corrections to the signal with the aid of these electrical signal converters, so as to compensate for minor deviations from sufficiently accurate proportionality.

DISCLOSURE OF THE INVENTION

TECHNICAL PROBLEMS

When considering the present standpoint of techniques as described above with reference to known fundamental principles for measuring the total flow through a main conduit it will be seen that one qualified technical problem resides in realising the significance of providing on the basis of a by-pass flowmeter, a flowmeter which will measure flow accurately and which will provide a flow measuring dynamic which is considerably greater than the dynamic hitherto afforded by the known flow measuring systems described above.

A still more qualified technical problem is one of realizing the significance of further developing the fundamental conditions and principles of the by-pass meter so as to enable the meter to utilize all types of flowmeters in its measuring conduit and to make corrections which not only take into consideration the measuring device but also the instant or current throughflow area.

It will also be seen that a technical problem resides in realizing, among other things as a first step towards the object of providing a flowmeter which will solve the aforesaid technical problems, that the bypass meter shall be complemented with a flow-dependent, variable throughflow area, in principle previously known in differential pressure flowmeters.

It will also be seen that a technical problem is one of realizing that a second step towards the object of providing a flowmeter which solves the aforesaid technical problems is associated with the possibility of linearizing the measuring signals obtained from the subflow meter, so that subsequent being corrected as required, the signal can represent the proportionality to the total flow through the main conduit within a large flowmeter dynamic, for instance a dynamic above 1000:1.

In the case of a by-pass meter of the kind described in the introduction and complemented in accordance with the aforegoing, it will be seen that a technical problem resides in realizing the possibility of using a less stringent mathematical relationship between a signal obtained from the subflow meter and a prevailing total flow, wherein a conical body disposed in the main conduit is intended to provide a greater throughflow area in response to increasing pressure differences across the constriction, and vice versa.

In this regard, a technical problem resides in the significance of utilizing the fact that in the event of a low total flow a relatively large part of this flow will pass to the measuring conduit and that in the case of a large total flow a relatively small, very small, part of this flow will pass through the measuring conduit, and therewith to realize that a large flow of medium through the main conduit will result in a much smaller increase in the by-pass flow through the measuring conduit than in the case of a fixed throughflow area, which experience shows would result in a proportional increase of the instant flow through the measuring conduit and vice versa.

Against this background, it will be seen that a technical problem resides in the ability to realize the significance of using a compensating device, normally included in the electronic signal converter, such as to compensate the output signal from the by-pass meter in response to occurrent discrepancies in a manner to achieve precise proportionality with the instant total flow through the main conduit.

It will also be seen that a technical problem is one of realizing the significance of configuring the aforesaid conical body as more or less a truncated conical body with the cone apex pointing towards the flow direction in the main conduit, and permitting the conical body to be axially movable in relation to a fixed throttling plate as to define a given throughflow area which is related to the instant flow.

It will also be seen that a technical problem resides in realizing the significance of utilizing in this application a spring device which is active in urging the conical body in a direction towards the throttle disc or plate with an adapted force, so as to displace the conical body towards the formation of smaller throughflow areas as the flow decreases.

Another technical problem is one of realizing the significance of adapting the force exerted by the spring device to a value which corresponds to a selected maximum flow through the main conduit and the main conduit section when its narrowest part is located in or adjacent to a plane of the throttle or constriction at said maximum flow.

Finally, it will be seen that a technical problem resides in realizing the significance of using an electronic signal converter which is so constructed that subsequent to calibration it will convert each occurrent flow in the measuring conduit and the corresponding output signal of the by-pass flowmeter to a value which corresponds to the instant total flow through the main conduit.

SOLUTION

The present invention is intended to solve one or more of the aforesaid technical problems on the basis of a flowmeter of the kind which utilizes a constriction which is disposed in a main-conduit section and which defines a throughflow area therein, a measuring conduit which is connected in parallel across the constriction, wherein a by-pass flow is caused to pass through the measuring conduit by the pressure difference across the constriction caused by the flow in the main-conduit section, a measuring device connected in the measuring conduit, and an electronic signal converter which functions to convert a signal delivered by the measuring device to a signal which corresponds to the total flow through the main conduit.

It is proposed that the area of the main conduit constriction is regulated by a conical body which is disposed in the main conduit such as to produce an increasing throughflow area in response to an increasing pressure difference across the constriction or an increasing flow through the throughflow area, or vice versa.

The use of a movable conical body in a fixed constriction will result in an increasing instant flow through the main conduit, due to the concurrent movement of the conical body, such that in the event of a large flow, the instant flow through the measuring conduit will increase to a lesser extent than would otherwise be the case when the throughflow area of the constriction is fixed, which seen practically results in precise proportionality (without a conical body and a fixed constriction or with a fixed conical body).

Furthermore, the use of a conical body which is moveable in a fixed constriction necessarily implies the use of a complex compensating device, normally integrated with the electronic signal converter, so adapted as to be capable of fully compensating a signal obtained from the by-pass flowmeter in response to occurrent, instant discrepancies, to proportionality to the total flow through the main conduit. Correspondingly, although conversely, an adjustment or adaptation takes place at decreasing instant flows.

By way of suggested embodiments that fall within the scope of the inventive concept it is proposed that the conical body shall have a truncated, or at least essentially truncated, conical configuration, with the cone apex pointing towards the flow direction in the main-conduit section, and that the conical body is mounted for movement in relation to a fixed constriction.

It is also proposed that a spring device is provided for urging the conical body in a direction towards the fixed constriction in an adapting fashion, by adapting the force exerted by the spring device in accordance with selected minimum and maximum flows through the main conduit.

Finally, it is proposed that the aforesaid electronic signal converter is constructed to assign, through calibration, to each selected by-pass flow measured in the flowmeter a value which corresponds to the prevailing or instant total flow while taking the positional setting of the conical body into account.

ADVANTAGES

The advantages primarily afforded by the inventive flowmeter reside in the creation of conditions which enable the dynamic of a flowmeter which operates in accordance with the principles of measuring instant flow in a measuring conduit connected in parallel with a constriction in a main-conduit section to be greatly increased, while still providing a flowmeter whose output signal is linear to the total flow through the main conduit, due to a particular compensation facility afforded by an associated electronic signal converter.

The primary characteristic features of an inventive flowmeter are set forth in the characterizing clause of the following claim 1.

BRIEF DESCRIPTION OF THE DRAWINGS

An embodiment which is at present preferred and which possesses the characteristic features significant of the present invention will now be described and explained in more detail with reference to the accompanying drawings, in which.

DESCRIPTION OF EMBODIMENTS AT PRESENT PREFERRED

Figure 1:
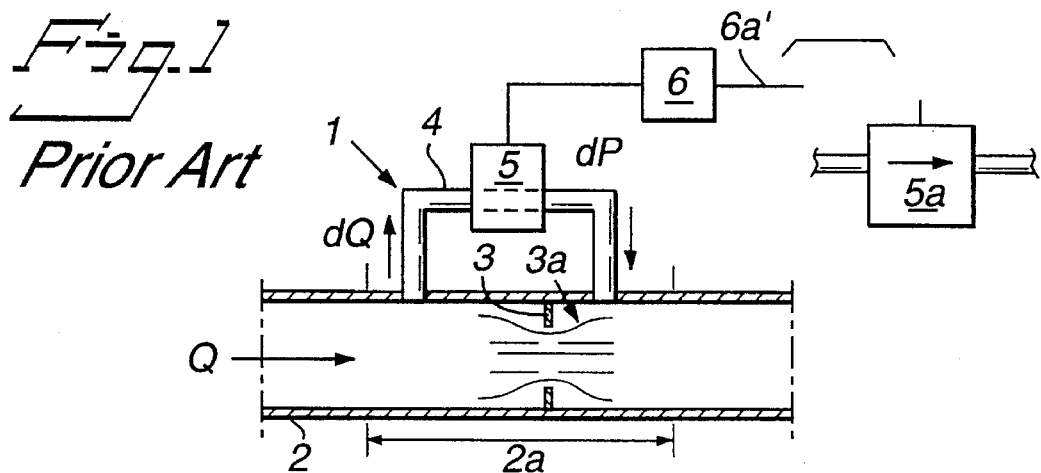
FIG. 1 illustrates the principles of a flowmeter which includes a section of a main conduit and which also includes a fixed constriction and a measuring conduit which is connected in parallel across the constriction and in which a by-pass flow is evaluated, wherein the present invention constitutes a further development of the illustrated arrangement.

FIG. 1 illustrates schematically a flowmeter 1 which includes a section 2a of a main conduit 2. The conduit section 2a has mounted therein a fixed constriction 3 and a measuring conduit or by-pass conduit 4 is connected in parallel across the constriction. A pressure difference created across the constriction 3 as a result of the rate of flow of the medium in the main-conduit section 2a causes a by-pass flow dQ to pass through the measuring conduit 4.

The measuring conduit 4 includes a measuring device 5 to which there is connected an electronic signal converter 6 which functions to convert the outward signal of the device 5 to a signal which corresponds to the total flow Q passing through the main conduit 2. In the illustrated case, the by-pass flow and main flow and the signals are essentially proportional.

The flowmeter 1 thus comprises a section 2a of a main conduit 2, a fixed constriction 3 which is mounted in the conduit section 2a and which defines a throughflow area 3a, a measuring conduit 4 which is connected in parallel across the constriction 3, a measuring device 5 which is connected to the measuring conduit and which can be said to deliver a signal which is representative of a quantified by-pass flow-section, and an electronic signal converter 6 which functions to deliver on a line 6a a signal which is proportional to the flow through the main conduit 2.

For the sake of simplicity, this signal is shown as an electric pulse representing a quantified by-pass flow-section through the measuring conduit.

The invention is based on the assumption that the flowmeter will function faultlessly when the measuring device 5 is comprised of earlier known means, such as a fluidistor oscillator 5a, a rotatable impeller, an inductive meter or similar means. Since these devices are known to the art they will not be described in great detail here.

It suffices to say that the device 5 includes a means (5a) which is able to determine the instant or occurrent by-pass flow dQ, by generating a pulse, for instance an electric pulse, for each determined, quantified flow part which passes through the measuring conduit and a corresponding, instant total flow Q through the main conduit 2 is calculated in dependence on an evaluated pulse frequency from an electronic signal converter and by proportionalization and possibly by a minor correction.

In the case of the FIG. 1 embodiment, the total measuring ratio (Qmax-Qmin) for the flow Q through the main conduit will be the same as the total measuring ratio applicable to the measuring device used. The flow dynamic (Qmax-Qmin) with this known technique is 50:1-100:1.

It should be noted that this ratio is a general ratio, irrespective of whether the means 5a is a mechanical meter (impeller) or a fluidistor oscillator meter.

Figure 2A:
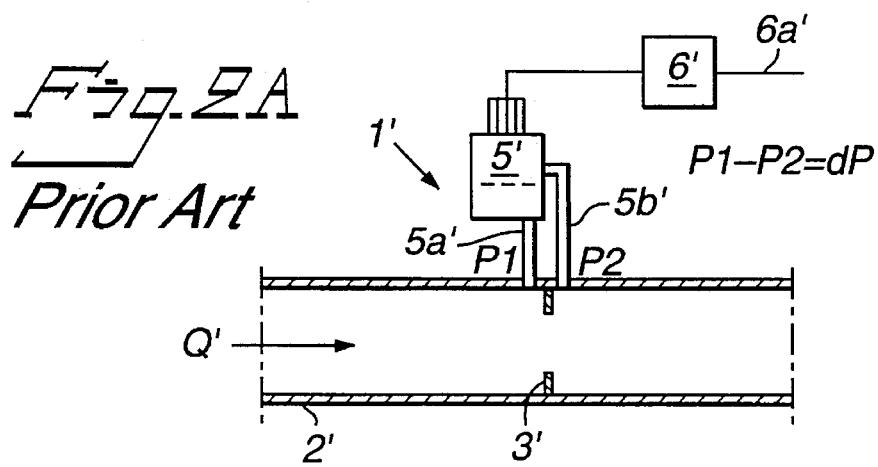
FIG. 2A illustrates a flowmeter constructed in accordance with the principle of determining occurrent pressure differences on each side of a fixed constriction in the main conduit.

FIG. 2A illustrates, in a similar manner, a flowmeter which operates in accordance with other principles and conditions than those described with reference to FIG. 1.

In the FIG. 2A embodiment, the flowmeter measures the instant pressure difference P1–P2=dP between the pressures occurring upstream and downstream of a fixed constriction 3' mounted in a main conduit 2' in a known manner.

The pressure P1 occurring upstream of the constriction 3' propagates through a narrow channel 5a' to a pressure difference meter 5', whereas the pressure P2 occurring downstream of the constriction 3' propagates through a narrow channel 5b' to the pressure difference meter 5', on each side of a membrane which moves in response to the pressure difference. The membrane coacts with a signal emitter 5c' in a known manner.

The illustrated flowmeter 1' includes a known pressure difference meter 5' which is connected to an electronic signal converter 6'. The electronic signal converter 6' is constructed to transpose the obtained signal in accordance with a quadratic function and in this way to deliver on the line 6a' a signal which is proportional to and which corresponds to the total flow Q'.

In this case, the achieved flowmeter dynamic will only be about 7:1.

Figure 2B:
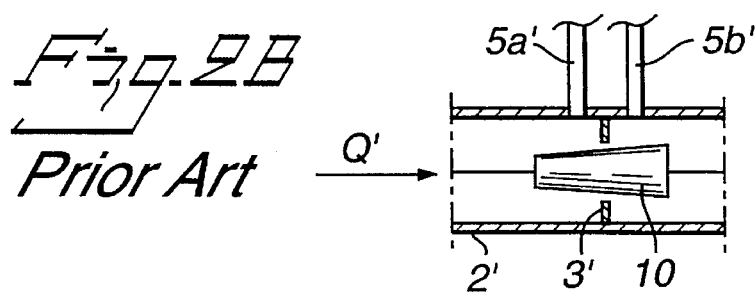
FIG. 2B illustrates the principles according to FIG. 2A when the constriction used has a variable throughflow area, said throughflow area increasing with larger flows through the main conduit, and vice versa.

As FIG. 2B is intended to show, it is known to introduce a body 10 which when the flow (Q') increases will increase the throughflow area, as a result of being displaced axially in a downstream direction, or vice versa. Although this body will result in a nonlinear output signal, it has been found to increase the dynamics of the flowmeter.

Practical experiences indicate that when there is included in the main conduit 2' a body 10 which is able to move in the direction of the longitudinal axis of the main conduit, the flow dynamic (Qmax/Qmin) can reach to 50:1, through the expedience of measuring the pressure in the conduits 5a' and 5b'.

Figure 3:
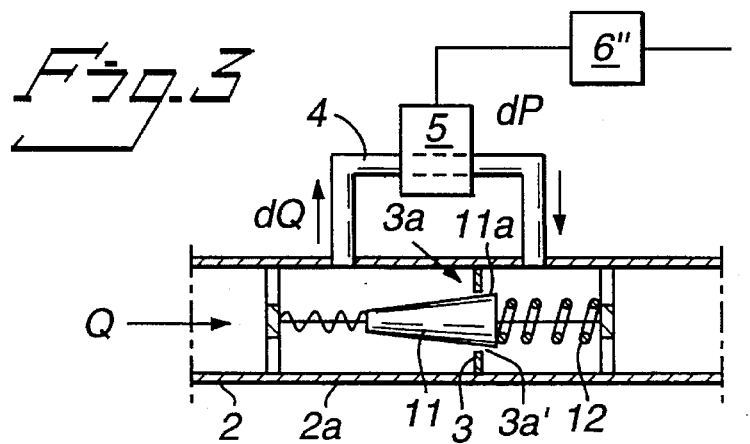
FIG. 3 illustrates schematically an inventive flowmeter which operates in a manner similar to the flowmeter shown in FIG. 1 but which, among other things, has been complemented with the features shown in FIG. 2B so as to enable the throughflow area to be varied in response to the instant flow in the main conduit.

FIG. 3 illustrates an inventive flowmeter embodiment which includes the components illustrated in FIG. 1. The significant feature of the FIG. 3 embodiment is that the measuring conduit 4 incorporates a small flowmeter 5 which is principally of the same kind as that illustrated in FIG. 1.

In this case, the necessary constriction is comprised of an orifice plate 3 and a conical body 11 which are mounted in the main-conduit section 2a, such that the widest part 11a of the conical body will seal against the inner edge surface 3a' of the plate 3 in the absence of flow, such as to present a small or zero throughflow area 3a.

Starting from a selected flow, it can be established that as the flow Q increases, the conical body 11 will be pressed to the right so as to increase the throughflow area (defined by the edge 3a' and the periphery of the conical body) and that when the flow Q decreases, the conical body 11 will be pressed to the left by means of a spring 12, so as to decrease the throughflow area 3a.

It can also be seen from FIG. 3 that when the flow Q through the main conduit 2 is small, the throughflow area will also be small or zero, so that all of the flow, or at least a large part of the total flow through the main conduit 2 will pass through the measuring conduit 4.

When the flow Q through the main conduit 2 is large, the throughflow area 3a will also be large and a smaller part dQ of the total flow Q will pass through the measuring conduit 4.

Figure 6:
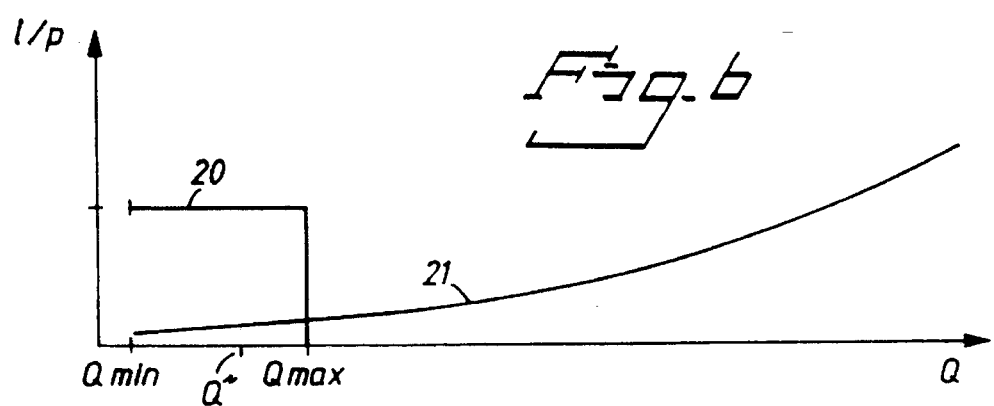
FIG. 6 is a diagram showing the volume representation of the by-pass meter in accordance with known techniques and in accordance with the invention in relation to the total flow.

These conditions will be seen more clearly from FIG. 6.

The conical body 11 is thus intended to increase the throughflow area in the main conduit in response to an increasing flow, which results in only a slight increase in the pressure difference in the measuring conduit 4, since the conical body 11 is moved to the right in FIG. 3 and the spring 12 is compressed. This means that the proportional ratio illustrated in FIG. 1 between the subflow dQ in the measuring conduit 4 and the flow Q through the main conduit 2 no longer exists.

When the flowmeter includes a constriction 3 and a conical body 11 mounted in the constriction, the proportional relationship between subflow dQ and total flow Q obtained with a fixed constriction will be changed such that in the case of a large flow the subflow dQ will not increase so radically but will be small through the measuring conduit 4 in relation to the instant main flow Q through the main conduit section 2a.

The illustrated conical body 11 has a truncated conical configuration, with the cone apex pointing in a direction towards the direction of flow through the main conduit 2, and is axially movable in the main-conduit section 2a in relation to the fixed constriction 3 and is positioned centrally in the conduit section 2a.

A spring device 12 is active in pressing the aforesaid conical body 11 towards the constriction 3, with the force exerted by said spring means 12 being adapted to a chosen minimum and maximum flow through the main conduit 2.

The minimum flow is that flow from which the flowmeter functions, and minimum flow conditions the conical body 11 will normally be located in a position in which its peripheral surface defines a small throughflow area 3a with the edge surface 3a' of the fixed constriction 3.

At maximum flow, the conical body 11 will be located in a position to the right of the constriction in which it defines a large throughflow area 3a.

The electronic signal converter 6" is also constructed so that it can assign, via calibration, to each evaluated by-pass flow dQ passing through the measuring conduit 4 a value which corresponds to the instant total flow Q (while taking into account the influence of the conical body 11 in its current positional setting).

Figure 4:
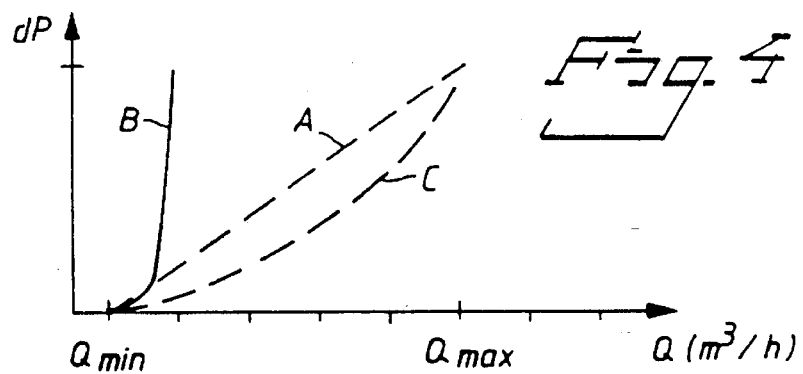
FIG. 4 is a diagram which shows a number of curves representing pressure difference variation in the absence of compensation in relation to the total flow for the flowmeters illustrated in FIGS. 1, 2A and 2B.

The curves in the diagram of FIG. 4 are intended to show the dynamics (Qmax/Qmin) of the flowmeter constructions illustrated in FIGS. 1, 2A and 2B.

The curves are chosen so that Qmax represents a maximized and same pressure drop dP across the flowmeter 5, 5'.

Curve A is meant to illustrate the proportional relationship of the pressure drop with the total flow in the case of a flowmeter according to FIG. 1.

In practice only a minor correction is required in this case, since the curve is essentially a straight line.

The curve B is intended to illustrate the quadratic relationship of the pressure drop with the volume flow in the case of a subflow meter according to FIG. 2A having a fixed constriction 3'.

In practice, a mathematical calculation and a correction are required in order to achieve proportionality.

Curve C is intended to illustrate the relationship that occurs with a variable throughflow area, in accordance with FIG. 2B.

In practice, an accurate correction is required in this case in order for the signal to be proportional to the instant total flow.

Figure 5:
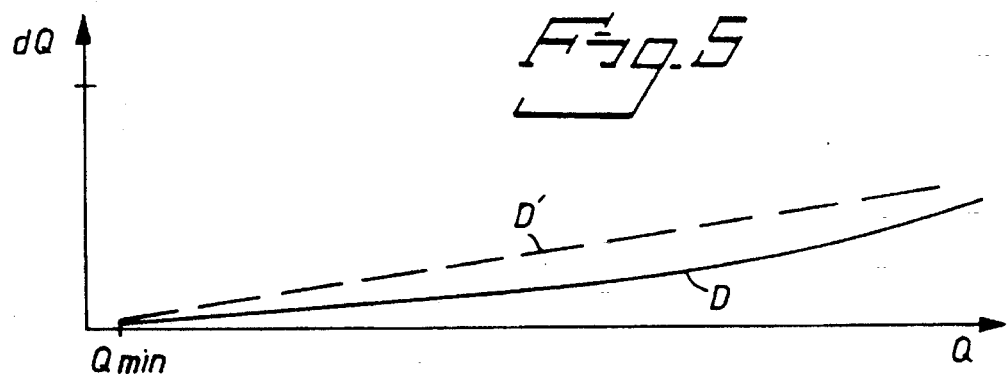
FIG. 5 is a diagram which includes curves showing the variation in the by-pass flow in the absence of compensation and with compensation, in relation to the total flow.

FIG. 5 illustrates a curve D which is representative of the invention.

Curve D is intended to illustrate the relationship of the by-pass volume to the total flow volume when using an inventive measuring device, in which the flowmeter dynamic can be as large as 2500:1.

FIG. 5 is intended to illustrate that the output signal obtained from the subflow meter 5 and which is not corrected can be considered to follow the curve D, and that it is therefore necessary to introduce a correction towards the straight line represented by curve D' in order to achieve proportionality between the obtained output signal and the instant total flow.

The flowmeter dynamic can at least be assumed to exceed 1000:1, and a value of about 1500:1 is thought to be appropriate. It is also believed to be most appropriate to choose the flowmeter dynamic range within the limits of 1000:1–2000:1.

It should be noted in this regard, as FIG. 5 is intended to show, that the relationship is not a linear relationship, but that the electronic signal converter 6" shall include the necessary means for compensating for occurrent deviations with sufficiently small resolution with the aid of a calibrating procedure.

It can be mentioned that the flowmeter dynamic may be increased to lie within the upper range, by using a flowmeter 5 which has an extremely small internal pressure drop, such as an inductive flow transducer.

The compensation necessary in accordance with the invention will now be explained in more detail with initial reference to FIG. 6. This figure illustrates that in the case of a by-pass meter of the kind illustrated in FIG. 1, in which there is precise proportionality between the flow passing through the measuring conduit and the flow passing through the main conduit, the small by-pass flow or the quantified subflow parts (liter/pulse "l/p") measured in the measuring conduit 4 is constant, irrespective of the instant total flow through the main conduit 2.

This is illustrated with a straight line 20 in FIG. 6.

It can also be established that an increasing total flow will result in an increasing by-pass flow through the measuring conduit, and that the frequency of the signals delivered by the flowmeter 5 will therefore increase, and vice versa.

The output pulses of the flowmeter 5 therewith have a frequency f which varies linearly with changes in the instant volume flow through the main conduit.

Figure 7:
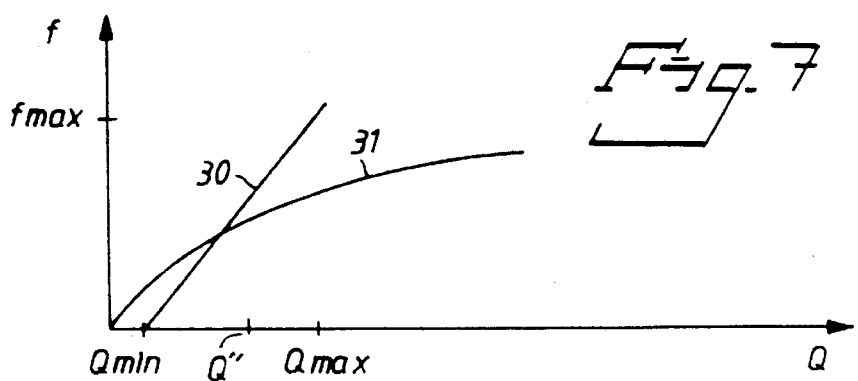
FIG. 7 is a diagram showing signal frequency variation in accordance with known techniques and in accordance with the present invention in relation to the total flow.

This is illustrated with a sloping, straight line 30 in FIG. 7.

When considering the present invention as illustrated in FIGS. 6 and 7, it will be seen that the by-pass flow, or each quantified subflow section l/p measured in the measuring conduit 4 will represent different total flows in accordance with the line 21.

Thus, it can be read from FIG. 6 that a measured flow through the measuring conduit 4 within the region of Qmin represents a small total flow Q. The ratio can then be set at 1:1.

Depending, among other things, on the configuration of the conical body, the ratio will increase in accordance with the line 21 with increasing flows Q, such that the flow measured in the measuring conduit 4 will represent a successively greater total flow Q through the main conduit 2.

A corresponding comparison with FIG. 7 will show that the generated pulse frequency will be greater and smaller than proportional, in accordance with the line 31.

When comparing with the earlier known construction shown in FIG. 1, it can be said in summary that with a given total flow Q' through the main conduit 2, the inventive flowmeter will provide, through correction, a value Q" which is calculated from a quantified bypass flow part and which is smaller or greater than that obtained with earlier known constructions and from a frequency which is greater or smaller than that obtained with earlier known constructions.

This means that with an instant flow Q" and with an increase in the volumetric flow or instant flow through the main conduit 2, the new instant flow value will result in a smaller increase in the by-pass flow dQ through the measuring conduit 4 than is obtained with a fixed constriction, due to an increase in the throughflow area.

Finally, it will be noted that the configuration of the illustrated conical body is such as to provide a given relationship between its axial movement and the increase in throughflow area, and that this configuration is inexpensive in manufacture.

However, there is nothing to prevent the conical body being given another form which provides another relationship and affords a smaller electronic compensation, although it can be expected that the manufacturing costs will then be higher.

It will be understood that the invention is not restricted to the aforedescribed, exemplifying embodiment thereof and that modifications can be made within the concept of the invention as illustrated in the following claims.

I claim:

1. A flowmeter having a constriction (3) formed in a main-conduit, a measuring conduit (4) which is connected to the main conduit upstream and downstream of the constriction and through which a by-pass flow (dQ) is caused to pass from a main flow in the main-conduit by the pressure difference across the constriction (3), and a by-pass flowmeter (5) mounted along the measuring conduit (4), comprising:

a conical body (11) forming the constriction which is movably mounted in the main-conduit to produce an increasing throughflow area (3a) in response to an increasing pressure difference across the constriction (3), wherein in the case of a large increase in flow through the main conduit (2) the conical body moves to produce an increased throughflow area so that the by-pass flow through the measuring conduit increases by an amount that is proportionally less than the said increase in the main flow; and the flowmeter being calibrated to compensate for the non-proportionality of the increasing flow rates through the main conduit and the measuring conduit to indicate the total flow through the main conduit (2).

2. A flowmeter according to claim 1, wherein the conical body (11) has a substantially truncated conical configuration, with the cone apex facing in a direction towards the flow direction in the main conduit (2) and in which the conical body is movable in relation to a fixed portion of the constriction (3).

3. A flowmeter according to claim 1, further comprising a spring device (12) which functions to urge the conical body (11) in a direction towards the constriction (3).

4. A flowmeter according to claim 3, further comprising that the spring device has a spring force that is sufficient to balance the force acting on the conical body due to the pressure differences across the constriction at maximum flow, and at said maximum flow maintain the conical body in cooperation with the constriction.

5. A flowmeter according to claim 1, wherein an electronic signal converter (6') is coupled to said bypass flowmeter and is calibrated to assign a value to each level of flow through the measuring conduit, each value corresponding to a total flow through the main conduit.

6. A flowmeter according to claim 1, wherein the flowmeter has a selected flowmeter dynamic of above 1000:1, the flowmeter dynamic being defined as the ratio between mass flow through the main conduit at upper and lower limits, respectively, of the measuring range of mass flow through the main conduit.

7. A flowmeter comprising:

a main conduit operable to transmit a main fluid therethrough;

a movable constriction device housed in the main conduit, the constriction device defining a variable fluid throughflow area in the main conduit, the movable constriction device selectively movable in response to changes in fluid pressure drop across the constriction device to increase the fluid throughflow area when the pressure drop increases and to decrease the fluid throughflow area when the pressure drop decreases;

a by-pass conduit in fluid connection with the main conduit upstream and downstream of the constriction device, the by-pass conduit operable to transmit a by-pass flow therethrough; and a calibrated flowmeter mounted along the by-pass conduit, the calibrated flowmeter directly monitoring the by-pass flow and determining a main flow rate through the main conduit based on a by-pass flow rate.

8. A flowmeter according to claim 7, wherein the calibrated flowmeter accurately determines a range of main flow rates from a selected lower main flow rate to a selected upper main flow rate, the upper main flow rate being about 1000 times greater than the lower main flow rate.

9. A flowmeter comprising:

a main conduit operable to transmit a main fluid flow therethrough a movable constriction device housed in the main conduit, the constriction device defining a variable fluid throughflow area in the main conduit, the variable fluid throughflow area variable based on a variable fluid pressure drop across the constriction device, the variable fluid throughflow area variable from a first throughflow area corresponding to a first main flow rate through the main conduit and a first fluid pressure drop, to a greater second throughflow area corresponding to a greater second main flow rate through the main conduit and a greater second fluid pressure drop, the second main flow rate being greater than would be expected if the first throughflow area remained constant as the first pressure drop increased to the second pressure drop;

a by-pass conduit in fluid connection with the main conduit upstream and downstream of the constriction device, the by-pass conduit operable to transmit a variable by-pass flow therethrough, the by-pass flow variable from a first by-pass flow rate corresponding to the first main flow rate, to a second by-pass flow rate corresponding to the second main flow rate, the second by-pass flow rate being less than would be expected if the first throughflow area remained constant as the first pressure drop increased to the second pressure drop; and a calibrated flowmeter provided in the bypass conduit, the calibrated flowmeter in communication with the by-pass flow and determining the main flow rate based on the by-pass flow rate, the calibrated flowmeter calibrated to accurately determine the main flow rate when the second main flow rate ranges up to at least 1000 times greater than the first main flow rate.

* * * * *

UNITED STATES PATENT AND TRADEMARK OFFICE
CERTIFICATE OF CORRECTION

PATENT NO. : 5,554,805
DATED : September 10, 1996
INVENTOR(S) : Bahrton

It is certified that error appears in the above-indentified patent and that said Letters Patent is hereby corrected as shown below:

On the title page item [56],

In References Cited:

U.K. Patent 2257: "2/1986" should be --2/1886--

Column 3, line 66: "bypass" should be --by-pass--

Column 12, line 21: "therethrough" should be --therethrough;--

Signed and Sealed this

Twenty-ninth Day of April, 1997

Attest:

BRUCE LEHMAN

Attesting Officer

Commissioner of Patents and Trademarks